United States Patent
Abdoli et al.

(10) Patent No.: US 11,089,582 B2
(45) Date of Patent: Aug. 10, 2021

(54) METHOD AND SYSTEM FOR DOWNLINK CONTROL INFORMATION PAYLOAD SIZE DETERMINATION

(71) Applicant: Huawei Technologies Co., Ltd., Shenzhen (CN)

(72) Inventors: Javad Abdoli, Kanata (CA); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 16/295,558

(22) Filed: Mar. 7, 2019

(65) Prior Publication Data

US 2019/0313378 A1    Oct. 10, 2019

Related U.S. Application Data

(60) Provisional application No. 62/653,295, filed on Apr. 5, 2018.

(51) Int. Cl.
    *H04W 72/04* (2009.01)
    *H04W 52/32* (2009.01)

(52) U.S. Cl.
    CPC ....... *H04W 72/042* (2013.01); *H04W 52/325* (2013.01)

(58) Field of Classification Search
    CPC .................... H04W 72/042; H04W 52/325
    See application file for complete search history.

(56) References Cited

U.S. PATENT DOCUMENTS

| | | | |
|---|---|---|---|
| 2012/0063324 A1* | 3/2012 | Kim .................. | H04L 5/0053 370/241 |
| 2012/0063351 A1* | 3/2012 | Kim .................. | H04L 5/001 370/252 |
| 2012/0078933 A1* | 3/2012 | Kim .................. | H04W 72/0406 707/758 |
| 2012/0182950 A1* | 7/2012 | Chung ................ | H04L 5/0053 370/329 |

(Continued)

FOREIGN PATENT DOCUMENTS

| | | |
|---|---|---|
| CN | 103931255 A | 7/2014 |
| CN | 107453840 A | 12/2017 |

OTHER PUBLICATIONS

U.S. Appl. No. 62/647,593, filed Mar. 2018, Lee; Heechoon.*

(Continued)

*Primary Examiner* — Jael M Ulysse
(74) *Attorney, Agent, or Firm* — Slater Matsil, LLP

(57) ABSTRACT

Aspects of the present disclosure provide methods, devices and systems that limit a number of DCI payload sizes in order to limit the complexity of processing needed to perform blind decoding of the DCI payload. Various embodiments are provided that limit the number of DCI payload sizes. A base station determines the payload sizes to be used for a given time slot and once generated, transmits the DCI to one or more UEs. The UE is responsible for receiving the DCI and performing blind decoding to decode the information intended for the UE. In some embodiments, limiting the number of payload sizes may result in some DCI content that is smaller than the allotted DCI payload size being padded with zero bits to fill the allotted DCI payload size.

14 Claims, 10 Drawing Sheets

(56) References Cited

U.S. PATENT DOCUMENTS

| | | | |
|---|---|---|---|
| 2013/0010714 A1* | 1/2013 | Kim | H04L 5/0092 370/329 |
| 2013/0016672 A1* | 1/2013 | Yang | H04L 5/0053 370/329 |
| 2013/0058294 A1* | 3/2013 | Miki | H04L 5/001 370/329 |
| 2013/0121280 A1* | 5/2013 | Ouchi | H04L 5/0048 370/329 |
| 2014/0050130 A1* | 2/2014 | Kim | H04L 5/1469 370/280 |
| 2014/0050191 A1* | 2/2014 | Kim | H04L 5/0053 370/329 |
| 2014/0105157 A1* | 4/2014 | Yang | H04L 5/0007 370/329 |
| 2014/0105164 A1* | 4/2014 | Moulsley | H04W 72/1289 370/329 |
| 2014/0233470 A1* | 8/2014 | Kim | H04L 5/0053 370/329 |
| 2015/0043355 A1 | 2/2015 | Kim et al. | |
| 2015/0271790 A1* | 9/2015 | Lee | H04W 72/042 455/450 |
| 2015/0296533 A1* | 10/2015 | Park | H04L 5/0092 370/329 |
| 2016/0338022 A1* | 11/2016 | Choi | H04L 1/1887 |
| 2016/0345199 A1* | 11/2016 | Nogami | H04W 76/27 |
| 2017/0064689 A1* | 3/2017 | Nimbalker | H04W 72/0406 |
| 2017/0135116 A1* | 5/2017 | Kuchibhotla | H04L 43/087 |
| 2017/0208568 A1* | 7/2017 | Nam | H04L 5/0094 |
| 2017/0367046 A1* | 12/2017 | Papasakellariou | H04L 5/0048 |
| 2018/0006763 A1* | 1/2018 | Kim | H04L 1/0026 |
| 2018/0077693 A1 | 3/2018 | Chen et al. | |
| 2019/0044689 A1* | 2/2019 | Yiu | H04W 72/042 |
| 2019/0103953 A1* | 4/2019 | Liao | H04W 76/28 |
| 2019/0141711 A1 | 5/2019 | Fu et al. | |
| 2019/0150183 A1* | 5/2019 | Aiba | H04W 72/0446 370/336 |
| 2019/0261405 A1* | 8/2019 | Ang | H04W 72/0446 |
| 2019/0274032 A1* | 9/2019 | Chatterjee | H04W 48/12 |
| 2019/0297604 A1* | 9/2019 | Lee | H04W 72/1268 |

OTHER PUBLICATIONS

Vivo, "Remaining details on DCI content and formats", 3GPP TSG RAN WG1 Meeting #92, R1-1801533, Feb. 26-Mar. 2, 2018, 5 Pages, Athens, Greece.

CMCC, "Discussion on DCI format design", 3GPP TSG RAN WG1 Meeting #92, R1-1802042, Feb. 26-Mar. 2, 2018, 7 Pages, Athens, Greece.

"RAN1 Chairman's Notes", 3GPP TSG RAN WG1 Meeting AH 1801, Jan. 22-26, 2018, 95 Pages, Vancouver, Canada.

"RAN1 Chairman's Notes", 3GPP TSG RAN WG1 Meeting #92, Feb. 26-Mar. 2, 2018, 151 Pages, Athens, Greece.

Ericsson, "On DCI sizes", TSG-RAN WG1 #92bis, Apr. 16-20, 2018, 4 Pages, Sanya, China.

* cited by examiner

| RNTI | DCI format | DCI payload size | BWP used for DCI size determination |
|---|---|---|---|
| C-RNTI | DCI format 0_1 | Size A | Active UL BWP |
| C-RNTI | DCI format 1_1 | Size B | Active DL BWP |
| C-RNTI | DCI format 0_0/1_0 in USS | Size C | Active DL BWP |
| All possible RNTIs other than C-RNTI | DCI format 0_0/1_0 in CSS | Size D | Initial DL BWP |
| All possible RNTIs | DCI format 2_2/2_3 in CSS | Size D | Initial DL BWP |
| All possible RNTIs | DCI format 2_0/2_1 in CSS | Configured with the same size as either of size A, B, C, or D | N/A |

FIG. 4

| RNTI | DCI format | DCI payload size | BWP used for DCI size determination |
|---|---|---|---|
| C-RNTI | DCI format 0_1 | Size A | Active UL BWP |
| C-RNTI | DCI format 1_1 | Size B | Active DL BWP |
| C-RNTI | DCI format 0_0/1_0 in USS | Size C | Active DL BWP |
| C-RNTI | DCI format 0_0/1_0 in CSS | Size C | Active DL BWP |
| All possible RNTIs other than C-RNTI | DCI format 0_0/1_0 in CSS | Size D | Initial DL BWP |
| All possible RNTIs | DCI format 2_2/2_3 in CSS | Size D | Initial DL BWP |
| All possible RNTIs | DCI format 2_0/2_1 in CSS | Configured with the same size as either of size A, B, C, or D | N/A |

FIG. 5

| RNTI | DCI format | DCI payload size | | BWP used for DCI size determination |
|---|---|---|---|---|
| C-RNTI | DCI format 0_1 | Size A | | Active UL BWP |
| C-RNTI | DCI format 1_1 | Size B | | Active DL BWP |
| C-RNTI | DCI format 0_0/1_0 in USS | In slot set 1: Size C | *TDM monitoring* | Active DL BWP |
| C-RNTI | DCI format 0_0/1_0 in CSS | In slot set 2: Size D | | Initial DL BWP |
| All possible RNTIs other than C-RNTI | DCI format 0_0/1_0 in CSS | Size D | | Initial DL BWP |
| All possible RNTIs | DCI format 2_2/2_3 in CSS | Size D | | Initial DL BWP |
| All possible RNTIs | DCI format 2_0/2_1 in CSS | Configured with the same size as either of size A, B, C, or D | | N/A |

FIG. 6

| RNTI | DCI format | DCI payload size | BWP used for DCI size determination |
|---|---|---|---|
| C-RNTI | DCI format 0_1 | Size A | Active UL BWP |
| C-RNTI | DCI format 1_1 | Size B | Active DL BWP |
| C-RNTI | DCI format 0_0/1_0 in USS | In slot set 1: Size C | Active DL BWP |
| C-RNTI | DCI format 0_0/1_0 in CSS | In slot set 2: Size D | Initial DL BWP |
| All possible RNTIs other than C-RNTI | DCI format 0_0/1_0 in CSS | Size D | Initial DL BWP |
| All possible RNTIs | DCI format 2_2/2_3 in CSS | Size D | Initial DL BWP |
| All possible RNTIs | DCI format 2_0/2_1 in CSS | In slot set 1: Configured with the same size as either of size A, B, C, or D | TDM monitoring N/A |
| All possible RNTIs | DCI format 2_0/2_1 in CSS | In slot set 2: Configured with size E | |

FIG. 7

METHOD AND SYSTEM FOR DOWNLINK CONTROL INFORMATION PAYLOAD SIZE DETERMINATION

CROSS REFERENCE TO RELATED APPLICATIONS

This application claims the benefit of priority to U.S. Provisional Patent Application Ser. No. 62/653,295 filed Apr. 5, 2018 and entitled "Method and System for Downlink Control information Payload Size Determination" the contents of which are incorporated herein by reference.

TECHNICAL FIELD

The present invention relates generally to a system and method for wireless communications, and, in particular embodiments, to a system and method for configuring a size of a Downlink Control Information (DCI) payload.

BACKGROUND

An air interface is the wireless communications link between two or more communicating devices, such as a radio access network device (e.g., a base station, base transceiver station (BTS), a Node-B (NodeB), an evolved NodeB (eNodeB), a Home eNodeB, a gNodeB, a transmission point (TP), a site controller, an access point (AP), or a wireless router) and an electronic device (ED) (e.g., a user equipment (UE), a mobile phone, a sensor, a camera). Typically, both communicating devices need to know specific parameters of the air interface in order to successfully transmit and receive a transmission.

Configuring the communicating devices with the same air interface parameters allows the communicating devices to reliably identify, organize and use physical resources, such as time, frequency, or time and frequency resources. Therefore, in current wireless communications systems, transmissions are typically communicated in accordance with one pre-defined configuration for the air interface.

Modern wireless networks, however, are increasingly used to support communications of diverse traffic types, which may have different characteristics and quality of service (QoS) requirements, such as latency, throughput, and simultaneous connections. Consequently, the different traffic types of modern wireless networks are not well-suited for a one-size-fits-all air interface configuration.

In wireless communications such as future Fifth Generation (5G) wireless communications (sometimes also known as New Radio (NR)), downlink control information (DCI) is transmitted through a physical downlink control channel (PDCCH) from the radio access network device to the ED to provide the ED with information about specific physical layer parameters such as scheduling of downlink or uplink data, and other configuration parameters.

An ED is configured with one or more bandwidth parts (BWPs) within the carrier bandwidth. Each BWP consists of a number of contiguous resource blocks (RBs) within the carrier. In certain scenarios, only one of the configured BWPs is active for the ED at a given time instant. In other scenarios, more than one of the configured BWPs are simultaneously active for the ED.

An ED is configured with a number of control resource sets (CORESETs) in each of the ED's configured BWPs. Each CORESET is a set of physical time and frequency resources for possible transmission of PDCCH. A number of search spaces are configured and associated with each CORESET. Each search space associated with a CORESET corresponds to a number of subsets of resources in the CORESET. Each subset corresponds to a PDCCH candidate, which might contain DCI for a particular ED.

The ED attempts to read the information in the DCI via a process known as "blind decoding". The location of the PDCCH containing the DCI, in physical time and frequency transmission resources, is not previously known to the ED. Therefore, the ED must blindly search for the PDCCH in a designated area of physical time and frequency resources (the aforementioned resource subsets in a search space) by making repeated attempts to decode PDCCH candidates in the search space.

Forward error correction (FEC) decoding is computationally intensive. The larger the number of blind decodings performed at the ED, the higher the complexity at the ED due to time and processing constraints. In order to limit the complexity, the number of blind decodings in a slot should be limited. The number of possible DCI payload sizes that the ED is expected to monitor in a time slot is a significant contributor to complexity. Each possible DCI payload size corresponds to a different code rate of the same PDCCH, which necessitates a separate FEC decoding operation as part of the blind decoding process.

In wireless communications such as NR, for example, it is desirable to limit the ED to only attempting a few (e.g., four in total per slot) different DCI payload sizes during blind decoding. However, multiple different types of DCI are required for different purposes, and to provide the desired flexibility in operating NR communications networks.

SUMMARY

Technical advantages are generally achieved by embodiments of this disclosure which describe a system and method for determining a size of a Downlink Control Information (DCI) payload. Examples of technical benefits may include a reduced number of DCI payload sizes, which can permit the use of an ED having reduced complexity.

According to a first aspect of the disclosure there is provided a method of transmitting including transmitting: control information for scheduling a physical uplink shared channel (PUSCH) using a non-fallback DCI in a first DCI format having a first payload size; and control information for scheduling a physical downlink shared channel (PDSCH) using a non-fallback DCI in a second DCI format having a second payload size; and control information for scheduling a PDSCH or a PUSCH using a user-specific search space using a fallback DCI in a third DCI format having a third payload size; and control information for scheduling a PDSCH or a PUSCH using a common search space using a fallback DCI in a fourth DCI format having a fourth payload size; and control information related to at least one of: identifying a slot format or pre-emption notification information, in a DCI format for use in a common search space having a payload size equal to one of a first, second, third or fourth payload sizes.

In some embodiments, the method further includes transmitting control information related to transmission power control (TPC) information in a DCI format for use in a common search space having a payload size equal to the fourth payload size.

In some embodiments, the fourth payload size of the fourth DCI format is based on an initial downlink (DL) bandwidth part (BWP).

In some embodiments, the first payload size of the first DCI format is based on an active uplink (UL) bandwidth part (BWP), and the second payload size of the second DCI format and the third payload size of the third DCI format are based on an active downlink (DL) bandwidth part (BWP) for one or more user equipment (UE) the non-fallback DCI or fallback DCI is intended for.

In some embodiments, the method further includes performing one or more of: appending cyclic redundancy check (CRC) bits to the DCI payload and scrambling the CRC bits with an RNTI; performing forward error correction (FEC) coding on the CRC-appended DCI payload; scrambling the FEC coded DCI payload with a scrambling sequence; modulating the scrambled FEC coded DCI payload to obtain modulated symbols; mapping the modulated symbols to a physical resource prior to transmission; and transmitting the modulated symbols.

In some embodiments, the method further includes padding content intended to fill the DCI payload when the content is smaller than the DCI payload size.

According to a second aspect of the disclosure there is provided a method of transmitting including transmitting: control information for scheduling a physical uplink shared channel (PUSCH) using a non-fallback DCI in a first DCI format having a first payload size; and control information for scheduling a physical downlink shared channel (PDSCH) using a non-fallback DCI in a second DCI format having a second payload size; and control information for scheduling a PDSCH or a PUSCH in a fallback DCI having a cyclic redundancy check (CRC) scrambled with a cell radio network temporary identifier (C-RNTI): for a first set of slots, in a third DCI format for use in a user-specific search space, the third DCI format having a third payload size; for a second set of slots, in a fourth DCI format for use in a common search space, the fourth DCI format having a fourth payload size; and control information for scheduling a PDSCH or a PUSCH in a common search space using a fallback DCI having a CRC scrambled with a radio network temporary identifier (RNTI) other than C-RNTI in a fifth DCI format being equal to the fourth payload size; and control information related to at least one of: identifying a slot format or pre-emption notification information, in a DCI format for use in a common search space having a payload size equal to one of the first, second, third or fourth payload sizes.

In some embodiments, the method further includes transmitting control information related to transmission power control (TPC) information in a DCI format for use in a common search space having a payload size equal to the fourth payload size.

In some embodiments, the fourth payload size of the fourth DCI format is based on an initial downlink (DL) bandwidth part (BWP).

In some embodiments, the first payload size of the first DCI format is based on an active uplink (UL) bandwidth part (BWP), and the second payload size of the second DCI format and the third payload size of the third DCI format are based on an active downlink (DL) bandwidth part (BWP) for one or more user equipment (UE) the non-fallback DCI or fallback DCI is intended for.

In some embodiments, the method further includes performing one or more of: appending cyclic redundancy check (CRC) bits to the DCI payload and scrambling the CRC bits with an RNTI; performing forward error correction (FEC) coding on the CRC-appended DCI payload; scrambling the FEC coded DCI payload with a scrambling sequence; modulating the scrambled FEC coded DCI payload to obtain modulated symbols; mapping the modulated symbols to a physical resource prior to transmission; and transmitting the modulated symbols.

In some embodiments, the method further includes padding content intended to fill the DCI payload when the content is smaller than the DCI payload size.

According to a third aspect of the disclosure there is provided a method of decoding downlink control information (DCI) based on one of four different DCI payload sizes, the method comprising: receiving a transmission over the air. The method further includes performing a blind decoding of a candidate time-frequency resource portion of the transmission by: selecting a first DCI payload size for a first DCI format for physical uplink shared channel (PUSCH) information in a non-fallback DCI; selecting a second DCI payload size for a second DCI format for physical downlink shared channel (PDSCH) information in a non-fallback DCI; selecting a third DCI payload size for a third DCI format for PDSCH information or PUSCH information in a user-specific search space in a fallback DCI; selecting a fourth DCI payload size for a fourth DCI format for PDSCH information or PUSCH information in a common search space in a fallback DCI; selecting a DCI payload size equal to one of the first, second, third or fourth DCI payload sizes for control information that relates to slot format information or pre-emption notification information in a common search space.

In some embodiments, performing the blind decoding of the candidate time-frequency resource portion of the transmission further comprises selecting a DCI payload size equal to the third DCI payload size for PDSCH information or PUSCH information in a common search space in a fallback DCI.

According to a fourth aspect of the disclosure there is provided a method of decoding downlink control information (DCI) based on one of four different DCI payload sizes, the method including receiving a transmission over the air. The method further includes performing a blind decoding of a candidate time-frequency resource portion of the transmission by: selecting a first DCI payload size for a first DCI format for physical uplink shared channel (PUSCH) information in a non-fallback DCI; selecting a second DCI payload size for a second DCI format for physical downlink shared channel (PDSCH) information in a non-fallback DCI; for a first set of slots, selecting a third DCI payload size for a third DCI format for PDSCH information or PUSCH information in a user-specific search space in a fallback DCI having cyclic redundancy check (CRC) scrambled with a cell-radio network temporary identifier (C-RNTI); for a second set of slots, selecting a fourth DCI payload size for a fourth DCI format for PDSCH information or PUSCH information in a common search space in a fallback DCI having CRC scrambled with C-RNTI; selecting a DCI payload size equal to the fourth DCI payload size for PDSCH information or PUSCH information in a common search space in a fallback DCI having CRC scrambled with RNTI other than C-RNTI; selecting a DCI format size equal to one of the first, second, third or fourth payload sizes for control information related to slot format in a common search; selecting a DCI format size equal to one of the first, second, third or fourth payload sizes for control information related to pre-emption information in a common search space.

In some embodiments, the control information is monitored in different slots sets, performing the blind decoding of the candidate time-frequency resource portion of the transmission further includes: for the first set of slots, selecting a DCI payload size equal to one of the first, second, third or fourth DCI payload sizes for control information in a common search space, or in a time-frequency resource size that is not known to a target of the control information; and for the second set of slots, selecting a DCI payload size equal a fifth DCI payload size for control information in a common search space.

According to a fifth aspect of the disclosure there is provided a device including a processor and a computer-readable medium having stored thereon computer-executable instructions. The computer-executable instructions, when executed by the processor, cause the device to transmit: control information for scheduling a physical uplink shared channel (PUSCH) using a non-fallback DCI in a first DCI format having a first payload size; and control information for scheduling a physical downlink shared channel (PDSCH) using a non-fallback DCI in a second DCI format having a second payload size; and control information for scheduling a PDSCH or a PUSCH in a user-specific search space using a fallback DCI in a third DCI format having a third payload size; and control information for scheduling a PDSCH or a PUSCH in a common search space using a fallback DCI in a fourth DCI format having a fourth time-frequency resource size; and control information related to at least one of: identifying a slot format or pre-emption notification information a DCI format for use in a common search space having a payload size equal to one of the first, second, third or fourth payload sizes.

In some embodiments, the device further includes computer-executable instructions, that when executed by the processor, cause the device to transmit control information related to transmission power control (TPC) information in a DCI format for use in a common search space having a payload size equal to the fourth payload size.

In some embodiments, the fourth payload size of the fourth DCI format is based on an initial downlink (DL) bandwidth part (BWP).

In some embodiments, the first payload size of the first DCI format is based on an active uplink (UL) bandwidth part (BWP), and the second payload size of the second DCI format and the third payload size of the third DCI format are based on an active downlink (DL) bandwidth part (BWP) for one or more user equipment (UE) the non-fallback DCI or fallback DCI is intended for.

In some embodiments, the computer-executable instructions when executed by the processor, further cause the device to: append cyclic redundancy check (CRC) bits to the DCI payload and scrambling the CRC bits with an RNTI; perform forward error correction (FEC) coding on the CRC-appended DCI payload; scramble the FEC coded DCI payload with a scrambling sequence; modulate the scrambled FEC coded DCI payload to obtain modulated symbols; map the modulated symbols to a physical resource prior to transmission; and transmit the modulated symbols.

In some embodiments, the computer-executable instructions when executed by the processor, further cause the device to pad content intended to fill the DCI payload when the content is smaller than the DCI payload size.

According to a sixth aspect of the disclosure there is provided a device including a processor and a computer-readable medium having stored thereon computer-executable instructions. The computer-executable instructions, when executed by the processor, cause the device to transmit: control information for scheduling a physical uplink shared channel (PUSCH) using a non-fallback DCI in a first DCI format having a first payload size; and control information for scheduling a physical downlink shared channel (PDSCH) using a non-fallback DCI in a second DCI format having a second payload size; and control information for scheduling a PDSCH or a PUSCH in a fallback DCI having cyclic redundancy check (CRC) scrambled with a cell-radio network temporary identifier (C-RNTI): for a first set of slots, in a third DCI format for use in a user-specific search space, the third DCI format having a third payload size; for a second set of slots, in a fourth DCI format for use in a common search space, the fourth DCI format having a fourth payload size; and control information for scheduling a PDSCH or a PUSCH in a common search space using a fallback DCI having CRC scrambled with RNTI other than C-RNTI in a fifth DCI format being equal to the fourth payload size; and control information related to at least one of: identifying a slot format or pre-emption notification information, in a DCI format for use in a common search space having a payload size equal to one of the first, second, third or fourth payload sizes.

In some embodiments, the device further includes computer-executable instructions, that when executed by the processor, cause the device to transmit control information related to transmission power control (TPC) information in a DCI format for use in a common search space having a payload size equal to the fourth payload size.

In some embodiments, the fourth payload size of the fourth DCI format is based on an initial downlink (DL) bandwidth part (BWP).

In some embodiments, the first payload size of the first DCI format is based on an active uplink (UL) bandwidth part (BWP), and the second payload size of the second DCI format and the third payload size of the third DCI format are based on an active downlink (DL) bandwidth part (BWP) for one or more user equipment (UE) the non-fallback DCI or fallback DCI is intended for.

In some embodiments, the computer-executable instructions when executed by the processor, further cause the device to: append cyclic redundancy check (CRC) bits to the DCI payload and scrambling the CRC bits with an RNTI; perform forward error correction (FEC) coding on the CRC-appended DCI payload; scramble the FEC coded DCI payload with a scrambling sequence; modulate the scrambled FEC coded DCI payload to obtain modulated symbols; map the modulated symbols to a physical resource prior to transmission; and transmit the modulated symbols.

In some embodiments, the computer-executable instructions when executed by the processor, further cause the device to: pad content intended to fill the DCI payload when the content is smaller than the DCI payload size.

According to a seventh aspect of the disclosure there is provided a user equipment (UE) including a processor and a computer-readable medium having stored thereon computer-executable instructions. The computer-executable instructions, when executed by the processor, cause the UE to receive a transmission over the air. In addition, cause the UE to perform a blind decoding of a candidate time-frequency resource portion of the transmission by: selecting a first DCI payload size for a first DCI format for physical uplink shared channel (PUSCH) information in a non-fallback DCI; selecting a second DCI payload size for a second DCI format for physical downlink shared channel (PDSCH) information in a non-fallback DCI; selecting a third DCI payload size for a third DCI format for PDSCH information or PUSCH information in a user-specific search space in a fallback DCI; selecting a fourth DCI payload size for a fourth DCI format for PDSCH information or PUSCH information in a common search space in a fallback DCI; selecting a DCI payload size equal to one of the first, second, third or fourth DCI payload sizes for slot format information or pre-emption information in a common search space.

In some embodiments, performing the blind decoding of the candidate time-frequency resource portion of the transmission further comprises selecting a DCI payload size equal to the third DCI payload size for PDSCH information or PUSCH information in a common search space in a fallback DCI.

According to an eighth aspect of the disclosure there is provided a user equipment (UE) including a processor and a computer-readable medium having stored thereon computer-executable instructions. The computer-executable instructions, when executed by the processor, cause the UE to receive a transmission over the air. In addition cause the UE to perform a blind decoding of a candidate time-frequency resource portion of the transmission by: selecting a first DCI payload size for a first DCI format for physical uplink shared channel (PUSCH) information in a non-fallback DCI; selecting a second DCI payload size for a second DCI format for physical downlink shared channel (PDSCH) information in a non-fallback DCI; for a first set of slots, selecting a third DCI payload size for a third DCI format for PDSCH information or PUSCH information in a user-specific search space in a fallback DCI; for a second set of slots, selecting a fourth DCI payload size for a fourth DCI format for PDSCH information or PUSCH information in a common search space in a fallback DCI; selecting a DCI payload size equal to the fourth DCI payload size for PDSCH information or PUSCH information in a common search space in a fallback DCI; selecting a DCI payload size equal to one of the first, second, third or fourth DCI payload sizes for slot format information or pre-emption information in a common search space.

In some embodiments, when the control information is monitored in different slots sets, performing the blind decoding of the candidate time-frequency resource portion of the transmission further involves for the first set of slots, selecting a DCI payload size equal to one of the first, second, third or fourth DCI payload sizes for control information in a common search space, or in a time-frequency resource size that is not known to a target of the control information; and for the second set of slots, selecting a DCI payload size equal a fifth DCI payload size for control information in a common search space.

BRIEF DESCRIPTION OF THE DRAWINGS

For a more complete understanding of the present invention, and the advantages thereof, reference is now made to the following description taken in conjunction with the accompanying drawings, in which:

FIG. 4 is a table illustrating payload sizes for different Downlink Control Information (DCI) according to an aspect of the disclosure.

FIG. 5 is a table illustrating payload sizes for different DCI according to another aspect of the disclosure.

FIG. 6 is a table illustrating payload sizes for different DCI according to a further aspect of the disclosure.

FIG. 7 is a table illustrating payload sizes for different DCI according to an aspect of the disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of the present disclosure provide a limited number of DCI payload sizes in order to limit the complexity of processing needed to perform blind decoding of the DCI payload. In some embodiments, limiting the number of payload sizes may result in some DCI content that is smaller than the allotted DCI payload size being padded with zero bits to fill the allotted DCI payload size.

The following paragraphs provide context in the form of the description of an overall system that includes both base stations and electronic devices served by the base stations.

Figure 1:
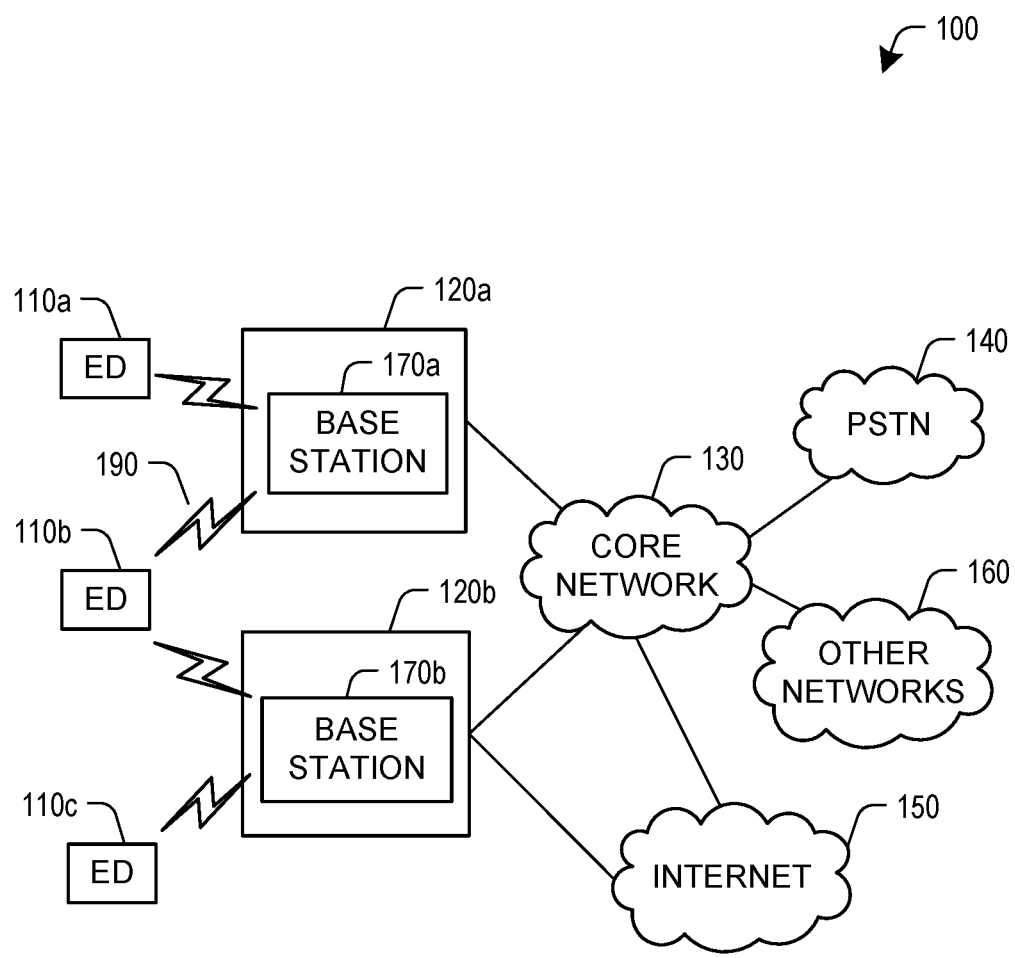
FIG. 1 is a network diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110*a*-110*c*, radio access networks (RANs) 120*a*-120*b*, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110*a*-110*c* are configured to operate in the communication system 100. For example, the EDs 110*a*-110*c* are configured to transmit, receive, or both via wireless or wired communication channels. Each ED 110*a*-110*c* represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120*a*-120*b* include base stations 170*a*-170*b*, respectively. Each base station 170*a*-170*b* is configured to wirelessly interface with one or more of the EDs 110a-110c, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 or the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), and/or relay nodes. The functions of a base station 170a, 170b may be localized to a single location, as shown, or be distributed within the network, such as distributed in the corresponding RAN. Also, the base station 170b forms part of the RAN 120b, which may include other base stations. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells if they are supported by the radio access technology. In some embodiments, multiple transceivers could be used for each cell, for example using multiple-input multiple-output (MIMO) technology. The number of RAN 120a-120b shown is an example only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HSPA (HSPA+) optionally including High Speed Downlink Packet Access (HSDPA), High Speed Packet Uplink Access (HSUPA), or both. Alternatively, a base station 170a-170b may establish an air interface 190 with Evolved UTMS Terrestrial Radio Access (E-UTRA) using Long-Term Evolution (LTE), LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP), and user datagram protocol (UDP). EDs 110a-110c may be multimode devices capable of operation according to multiple radio access technologies, and incorporate multiple transceivers necessary to support such.

In embodiments of the present invention, the communications system 100 is a heterogeneous communications system with different transmission source types and/or different transmission destination types. The different transmission source types may have different transmission capabilities. The different transmission destination types may have different reception capabilities.

In the heterogeneous communications system, the EDs 110a-110c of FIG. 1 include different types of devices having different capabilities and requirements. More specifically, each ED 110a-110c may be associated with a different traffic type having particular requirements for Quality of Service (QoS), latency, throughput, simultaneous connections, etc. Example EDs 110a-110c associated with different traffic types may include a smartphone, a computer, a television, a security camera, a sensor, a thermostat, a heart rate monitor, etc. In a particular example, ED 110a is a computer, ED 110b is a sensor, and ED 110c is a heart rate monitor. Each of the EDs 110a-110c may have different wireless communication capabilities and requirements.

Furthermore, in a heterogeneous communications system, the base stations 170a-170b may communicate with one or more of the EDs 110a-110c over one or more software-configurable air interfaces 190 using wireless communication links. The different radio access network devices (e.g., base stations 170a-170b) and electronic devices (e.g., ED 110a-110c) may have different transmission capabilities and/or requirements. As an example, an eNB may have multiple transmit antennas. A picocell may only have one transmit antenna or a relatively small number of transmit antennas. Additionally, a picocell may transmit at a lower maximum power level as compared to an eNB. Similarly, a computer may have much higher data bandwidth requirement and signal processing capability than a sensor. For another example, a heart rate monitor may have much stricter latency and reliability requirements than a television.

Therefore, in a heterogeneous communications system, such as heterogeneous communications system 100, different pairs of communicating devices (i.e., a network device and an electronic device; or a network device and another network device; or an electronic device and another electronic device) may have different transmission capabilities and/or transmission requirements. The different transmission capabilities and/or transmission requirements can be met by the availability to select different air interface configurations for different devices, communications, or requirements.

Figure 2:
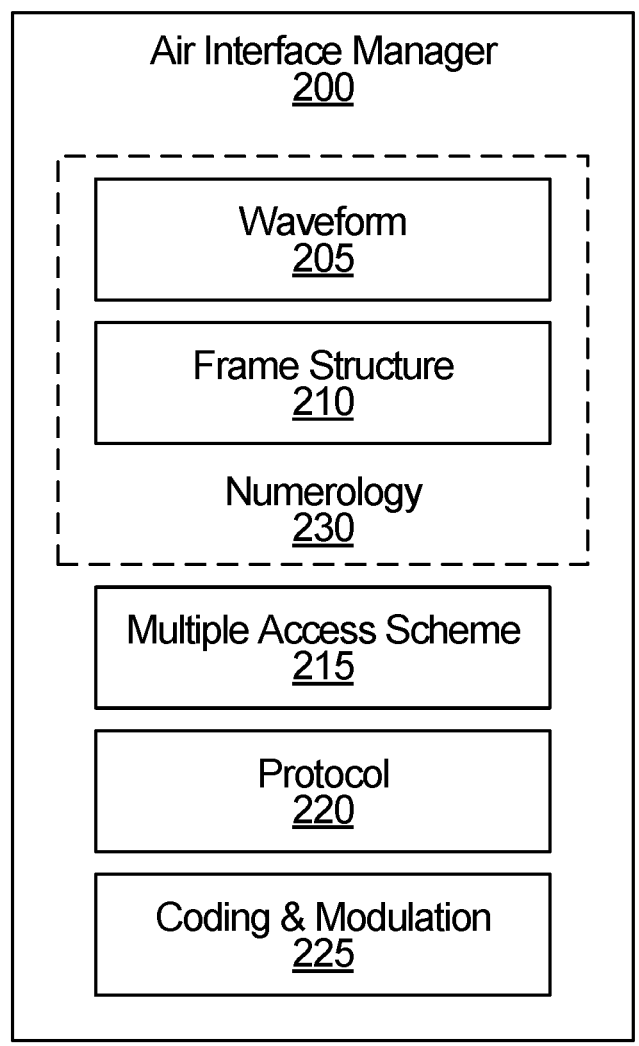
FIG. 2 is a block diagram of an air interface manager for configuring a software-configurable air interface.

FIG. 2 illustrates a schematic diagram of an air interface manager 200 for configuring a software-configurable air interface 190. Air interface manager 200 may be, for example, a module comprising a number of components or building blocks that define the parameters of the air interface 190 and collectively specify how a transmission is to be made and/or received by the air interface 190.

The components of the air interface manger 200 include at least one of a waveform component 205, a frame structure component 210, a multiple access scheme component 215, a protocol component 220, and a coding and modulation component 225.

The waveform component 205 may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

The frame structure component 210 may specify a configuration of a frame or group of frames. The frame structure component 210 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as subcarrier spacing width, symbol duration, cyclic prefix (CP) length, channel bandwidth, guard bands/subcarriers, and sampling size and frequency.

Additionally, the frame structure component 210 may further specify whether the frame structure is used in a time-division duplex communication or a frequency-division duplex communication.

Together, the specifications of the waveform component and the frame structure component are sometimes known as the "numerology." Thus, the air interface 190 may include a numerology component 230 defining a number of air interface configuration parameters, such as the sub-carrier spacing, cyclic prefix (CP) length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing may be compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 215 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free or configured grant access, non-orthogonal multiple access, orthogonal multiple access, e.g., via a dedicated channel resource (i.e., no sharing between multiple EDs), contention-based shared channel resource, non-contention-based shared channel resource, and cognitive radio-based access.

The protocol component 220 may specify how a transmission and/or a re-transmission are to be made. Non-limiting examples of transmission and/or re-transmission mechanism options include those that specify a scheduled data pipe size and a signaling mechanism for transmission and/or re-transmission.

The coding and modulation component 225 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

Because an air interface comprises a plurality of components or building blocks, and each component may have a plurality of candidate technologies (also referred to herein as air interface capability options), the air interface manager 200 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 200 and used for communications between the pair of communicating transmitting-receiving devices.

In further embodiments, the air interface manager 200 may modify or update its components, profiles, or capability options. For example, the air interface manager 200 may replace the waveform and frame structure components 205, 210, with a single numerology component 230. Conversely, the air interface manager 200 may separate the coding and modulation component 225 into an individual coding component and an individual modulation component. Furthermore, the air interface manager 200 is configurable such that new soft air interface configuration components developed in the future should be able to be utilized.

The air interface manager 200 may also update certain components to modify the capability options of any given component. For example, the air interface manager 200 may update the modulation and coding component 225 to include higher-order modulation schemes.

By updating the stored components, profiles, and candidate options, the air interface manager 200 can flexibly adapt to better accommodate diverse wireless traffic types and services. Modifying or updating components, profiles, and candidate options may allow the air interface manager 200 to provide suitable air interface profiles for traffic types or services other than those already contemplated for ultra-reliable low latency communications (URLLC), enhanced mobile broadband (eMBB), and massive machine-type communications (mMTC).

Figure 3A:
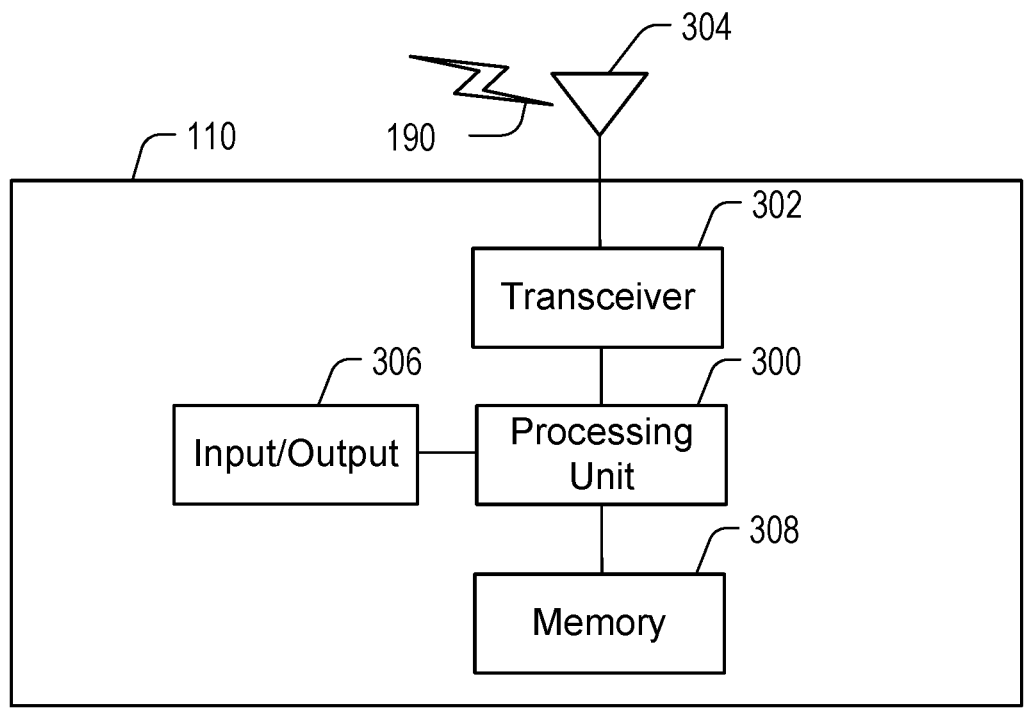
FIG. 3A is a block diagram of an example client side electronic device.
Figure 3B:
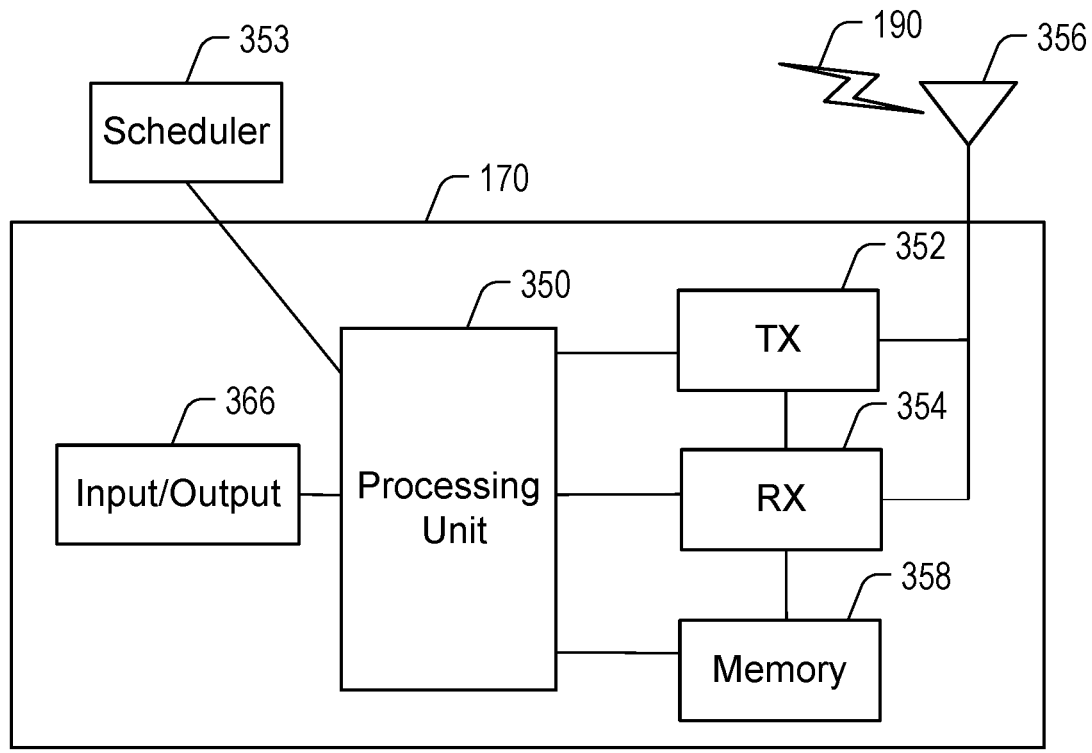
FIG. 3B is a block diagram of an example radio access network device.

FIGS. 3A and 3B illustrate example devices that may implement the methods and teachings according to this disclosure. In particular, FIG. 3A illustrates an example ED 110, and FIG. 3B illustrates an example base station 170. These components could be used in the communication system 100 or in any other suitable system.

As shown in FIG. 3A, the ED 110 includes at least one processing unit 300. The processing unit 300 implements various processing operations of the ED 110. For example, the processing unit 300 could perform signal coding, data processing, power control, input/output processing, or any other functionality enabling the ED 110 to operate in the communication system 100. The processing unit 300 may also be configured to implement some or all of the functionality and/or embodiments described in more detail above. Each processing unit 300 includes any suitable processing or computing device configured to perform one or more operations. Each processing unit 300 could, for example, include a microprocessor, microcontroller, digital signal processor, field programmable gate array, or application specific integrated circuit.

The ED 110 also includes at least one transceiver 302. The transceiver 302 is configured to modulate data or other content for transmission by at least one antenna 304 or Network Interface Controller (NIC). The transceiver 302 is also configured to demodulate data or other content received by the at least one antenna 304. Each transceiver 302 includes any suitable structure for generating signals for wireless or wired transmission and/or processing signals received wirelessly or by wire. Each antenna 304 includes any suitable structure for transmitting and/or receiving wireless or wired signals. One or multiple transceivers 302 could be used in the ED 110. One or multiple antennas 304 could be used in the ED 110. Although shown as a single functional unit, a transceiver 302 could also be implemented using at least one transmitter and at least one separate receiver.

The ED 110 further includes one or more input/output devices 306 or interfaces (such as a wired interface to the internet 150). The input/output devices 306 permit interaction with a user or other devices in the network. Each input/output device 306 includes any suitable structure for providing information to or receiving information from a user, such as a speaker, microphone, keypad, keyboard, display, or touch screen, including network interface communications.

In addition, the ED 110 includes at least one memory 308. The memory 308 stores instructions and data used, generated, or collected by the ED 110. For example, the memory 308 could store software instructions or modules configured to implement some or all of the functionality and/or embodiments described above and that are executed by the processing unit(s) 300. Each memory 308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 350, at least one transmitter (TX) 352, at least one receiver (RX) 354, one or more antennas 356, at least one memory 358, and one or more input/output devices or interfaces 366. A transceiver, not shown, may be used instead of the transmitter 352 and receiver 354. A scheduler 353 may be coupled to the processing unit 350. The scheduler 353 may be included within or operated separately from the base station 170. The processing unit 350 implements various processing operations of the base station 170, such as signal coding, data processing, power control, input/output processing, or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, microcontroller, digital signal processor, field programmable gate array, or application specific integrated circuit.

Each transmitter 352 includes any suitable structure for generating signals for wireless or wired transmission to one or more EDs or other devices. Each receiver 354 includes any suitable structure for processing signals received wirelessly or by wire from one or more EDs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the ED 110. The memory 358 stores instructions and data used, generated, or collected by the base station 170. For example, the memory 358 could store software instructions or modules configured to implement some or all of the functionality and/or embodiments described above and that are executed by the processing unit(s) 350.

Each input/output device 366 permits interaction with a user or other devices in the network. Each input/output device 366 includes any suitable structure for providing information to or receiving/providing information from a user, including network interface communications.

As described above, downlink control information (DCI) is transmitted in a PDCCH from the radio access network device, such as a base station, to the ED to provide the ED with information about specific physical layer parameters such as scheduling of downlink or uplink data, and other configuration parameters. The DCI may be transmitted using different DCI formats, which are designed for different purposes. Table 1 below shows examples of eight different DCI formats used for eight different purposes.

TABLE 1

| DCI formats | |
|---|---|
| DCI format | Usage |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI formats 0_0 and 1_0 are known as "fallback" DCI formats for scheduling of uplink data and downlink data, respectively. Fallback DCI formats are intended for use in performing basic radio link set up or reconfiguration or transmission of system information or to provide a robust downlink control mechanism to the base station in case the ED and base station have a different understanding on some system configuration parameters. Moreover, the fallback DCI can be also used as a compact DCI for a regular UE-specific data scheduling. The fallback DCIs may include less information than other DCI formats (e.g. the minimum amount of information to allow basic radio link set up or reconfiguration to occur).

DCI formats 0_1 and 1_1 are known as "non-fallback" DCI formats for scheduling of uplink data and downlink data, respectively. DCI formats 2_0 and 2_1 are DCI formats for notifying the ED about slot format information and pre-emption of information, respectively. DCI formats 2_2 and 2_3 are DCI formats for notifying the ED about transmit power control information. Although embodiments of the present application may be described below with specific reference to certain types of non-fallback, fallback and non-scheduling types of DCI, it should be understood that more generally, aspects of the disclosure can be used with many different types of DCI.

Aspects of the present disclosure are directed to different alternatives for determination of DCI payload sizes such that, for one carrier, at most 4 different DCI sizes are monitored by the UE per time slot and at most 3 different DCI sizes are monitored per Cell Radio Network Temporary Identifier (C-RNTI) per time slot.

In some embodiments, a base station determines the payload size of the DCI for a particular functionality. Then, the base station constructs the payload of the DCI such that actual payload size matches the determined payload DCI size. Several processes may be performed on the DCI payload before transmission. For example, Cyclic Redundancy Check (CRC) bits may be appended to the DCI payload. In some embodiments, the CRC bits are scrambled with an appropriate RNTI. Channel coding can then be performed on the resulting bits. The base station can then transmit the modified DCI payload in the PDCCH on certain time-frequency resources according to a certain mapping of PDCCH to time-frequency resources.

Upon receiving the transmission, the UE proceeds to perform one or more blind decodings of DCI candidates within the PDCCH based on particular DCI payload sizes as well as other parameters pertaining to the PDCCH configuration, such as particular RNTIs that may have been used in encoding the DCI payload. If the UE is not successful during a first blind decoding, the UE can continue to perform additional blind decodings until the DCI is successfully decoded. The UE may also find that there is no information, for example PDSCH or PUSCH allocation, in the PDCCH for the UE in the current slot.

The payload size of DCI formats 0_0/1_0 (fallback DCI) having a CRC scrambled with C-RNTI in a common search space (CSS) or in a UE-specific search space (USS) is set by the base station, and thus selected as one of a limited set of sizes at the UE. In some embodiments, the UE will monitor at most 3 different DCI payload sizes encoded with C-RNTI scrambling in a slot.

In subsequent portions of the description, referring to "C-RNTI scrambling" or "RNTI type scrambling" is intended to mean the CRC is scrambled by the C-RNTI or other RNTI type.

The payload size of DCI formats 0_0/1_0 for all possible RNTIs other than C-RNTI, as well as the payload size of all other DCI formats, are set by the base station, and thus selected as one of a limited set of sizes at the UE. In some embodiments, the UE will monitor at most a total of 4 different DCI payload sizes in a slot.

The payload size of DCI formats can be determined based on an initial downlink BWP or an active downlink BWP. The initial downlink BWP is the frequency-domain size of a time-frequency resource allocated to a UE when it initially accesses a network. The initial BWP may be used after the initial network access, but often the UE will be configured with an active BWP when further utilizing the network. The active BWP can be reconfigured as appropriate. The initial downlink BWP size (in terms of number of resource blocks) can be different than an active downlink BWP.

Provided below are four different embodiments in which the number of DCI payload sizes is limited to 4 DCI payload sizes for a particular slot and 3 DCI payload sizes with C-RNTI for the particular slot. Limiting the number of DCI payload sizes in this manner may be helpful in mitigating the complexity at the UE.

Embodiment 1: No DCI Formats 0_0/1_0 with C-RNTI in CSS

In a first embodiment, the UE does not monitor DCI formats 0_0/1_0 with C-RNTI in a CSS. To fulfill the DCI size budget of four DCI payload sizes per slot, the payload sizes of other DCI formats are provided as summarized in the table shown in FIG. 4.

The payload sizes of DCI formats 0_1 and 1_1 with C-RNTI scrambling are selected as first and second sizes (sizes A and B in the table in FIG. 4) where size A is based on the active UL BWP size and size B is based on the active DL BWP size. The payload size of DCI formats 0_0/1_0 with C-RNTI in USS is selected as a third size (size C in the table in FIG. 4) and the size is based on the active DL BWP. The payload size of DCI formats 0_0/1_0 in CSS (with RNTIs other than C-RNTI) is selected to be equivalent to the payload size of DCI formats 2_2/2_3 in CSS (size D in the table in FIG. 4), which is selected based on the initial DL BWP. DCI formats 2_0/2_1 in CSS can be selected to have a payload size that is the same size as any of sizes A, B, C, or D. In some embodiments, the UE is not configured to monitor DCI formats 2_0/2_1 in CSS at all (e.g. if the UE needs to monitor DCI 0_0/1_0, 0_1, 1_1, 2_2 and 2_3).

Where the contents intended to fill the DCI payload are not the same size as the particular DCI format for which they are intended, the remaining portion of the DCI payload can be padded with zero bits.

As can be seen from the table in FIG. 4, the DCI payload size budget of 3 sizes in a slot for payloads with C-RNTI scrambling (the first three rows of the table have three sizes A, B and C) and a total of 4 sizes (A, B, C and D) in a slot is fulfilled. In a given slot, a same set of 4 possible sizes and 3 sizes for C-RNTI are monitored per slot. For a different slot, 4 different sizes and 3 sizes for C-RNTI can be configured. In this particular embodiment, only one DCI format size is monitored in CSS per slot.

Embodiment 2: The Same Size for DCI Formats 0_0/1_0 with C-RNTI in Both CSS and USS In a second embodiment, DCI formats 0_0/1_0 with C-RNTI in CSS have the same payload size as that with C-RNTI in USS. To fulfill the DCI size budget of 4 DCI payload sizes and 3 DCI sizes with C-RNTI, the payload sizes of other DCI formats are determined as summarized in the table shown in FIG. 5.

The payload sizes of DCI formats 0_1 and 1_1 with C-RNTI scrambling are selected as first and second sizes (sizes A and B in the table in FIG. 5) where size A is based on the active UL BWP size and size B is based on the active DL BWP size. The payload size of DCI formats 0_0/1_0 with C-RNTI in both CSS and USS is selected as a third size (size C in the table in FIG. 5) based on the active DL BWP size. The payload size of DCI formats 0_0/1_0 in CSS (with RNTIs other than C-RNTI) is selected to be equal to the payload size of DCI format 2_2/2_3 in CSS and is selected to be a fourth size (size D in the table in FIG. 5), which is based on the initial DL BWP. DCI formats 2_0/2_1 in CSS can be selected to have a payload size that is the same size as any of sizes A, B, C, or D. In some embodiments, the UE is not configured to monitor the DCI formats 2_0/2_1 in CSS at all (e.g. if the UE needs to monitor DCI 0_0/1_0, 0_1, 1_1, 2_2 and 2_3).

Where the contents intended to fill the DCI payload are not the same size as the particular DCI format for which they are intended, the remaining portion of the DCI payload can be padded with zero bits.

As can be seen from the table in FIG. 5, the DCI payload size budget of 3 sizes in a slot for payloads with C-RNTI scrambling (the first four rows of the table have three sizes A, B and C) and a total of 4 sizes (A, B, C and D) in a slot is fulfilled. In a given slot, a same set of 4 possible sizes and 3 sizes for C-RNTI are monitored per slot. For a different slot, 4 different sizes and 3 sizes for C-RNTI can be configured. In this particular embodiment, DCI formats 0_0/1_0 with C-RNTI can be also monitored in CSS. Therefore, the base station can transmit UE-specific DL control signaling using fallback DCIs in CSS in addition to using fallback DCIs in USS.

Embodiment 3: TDM Monitoring in USS and CSS for DCI Formats 0_0/1_0 with C-RNTI

In a third embodiment, for a given slot, the UE either monitors DCI format 0_0/1_0 in USS with C-RNTI or monitors DCI format 0_0/1_0 with C-RNTI in CSS. The base station can schedule fallback DCI, for either UL or DL in USS and fallback DCI, for either UL or DL in CSS in a time domain multiplexing (TDM) manner. To fulfill the DCI size budget, the payload sizes of other DCI formats are determined as summarized in the table in FIG. 6.

The payload sizes of DCI formats 0_1 and 1_1 with C-RNTI scrambling are selected as first and second sizes (sizes A and B in the table in FIG. 6) where size A is based on the active UL BWP size and size B is based on the active DL BWP size. The payload size of DCI formats 0_0/1_0 with C-RNTI in USS is selected as a third size (size C in the table in FIG. 6) based on the active DL BWP. The payload size of DCI formats 0_0/1_0 in CSS (with all possible RNTIs) is selected to be equal to the payload size of DCI format 2_2/2_3 in CSS and is selected to be a fourth size (size D in the table in FIG. 6), which is based on the initial DL BWP. DCI formats 2_0/2_1 in CSS can be selected to have a payload size that is the same size as any of sizes A, B, C, or D. In some embodiments, the UE is not configured to monitor DCI formats 2_0/2_1 in CSS at all (e.g. if UE needs to monitor DCI 0_0/1_0, 0_1, 1_1, 2_2 and 2_3).

Where the contents intended to fill the DCI payload are not the same size as the particular DCI format for which they are intended, the remaining portion of the DCI payload can be padded with zero bits.

As can be seen from the table in FIG. 6, the DCI payload size budget of 3 sizes in a slot for payloads with C-RNTI scrambling (the first four rows of the table have three sizes A, B and C or A, B and D as sizes C and D occur in different slot sets) and a total of 4 sizes (A, B, C and D) in a slot is fulfilled. The base station can transmit UE-specific DL control signaling using fallback DCIs in CSS in a TDM manner with UE-specific DL control signaling using fallback DCIs in USS.

Embodiment 4: TDM Monitoring in USS and CSS for DCI Formats 0_0/1_0 with C-RNTI+TDM Monitoring for DCI Formats 2_0/2_1 in CSS In a fourth embodiment, similar to the third embodiment, for a given slot, the UE either monitors DCI format 0_0/1_0 in USS with C-RNTI scrambling or monitors DCI format 0_0/1_0 with C-RNTI scrambling in CSS. In addition, for a given slot, the UE can monitor DCI format 2_0/2_1 in CSS with all possible RNTIs in a time domain multiplexing manner. To fulfill the DCI size budget, the payload sizes of DCI formats are selected as summarized in the table in FIG. 7.

The payload sizes of DCI formats 0_1 and 1_1 with C-RNTI scrambling are selected as first and second sizes (sizes A and B in the table in FIG. 7) where size A is based on the active UL BWP size and size B is based on the active DL BWP size. The payload size of DCI formats 0_0/1_0 with C-RNTI in USS is selected to be a third size (size C in the table of FIG. 7), which is based on active DL BWP size. The payload size of DCI formats 0_0/1_0 in CSS (with all possible RNTIs) is selected to be equal to the payload size of DCI format 2_2/2_3 in CSS and is selected to be a fourth size (size D in the table in FIG. 7), which is based on the initial DL BWP.

For a given slot, the UE either monitors DCI format 0_0/1_0 in USS with C-RNTI scrambling (slot set 1) or monitors DCI format 0_0/1_0 with C-RNTI scrambling in CSS (slot set 2). Furthermore, the payload size of DCI formats 2_0/2_1 in CSS in slot set 2 is configured by higher-layer signaling (size E in the table in FIG. 7), or in some embodiments, the UE is not configured to monitor DCI formats 2_0/2_1 in CSS in slot set 2. Size E can be any one of sizes A, B, C or a further alternative size. In slot set 1, DCI formats 2_0/2_1 are either configured with the same size as any one of DCI payload sizes A, B, C, or D, or in some embodiments, the UE is not configured to monitor DCI formats 2_0/2_1 in CSS in slot set 1.

Where the contents intended to fill the DCI payload are not the same size as the particular DCI format for which they are intended, the remaining portion of the DCI payload can be padded with zero bits.

As can be seen from the table in FIG. 7, the DCI payload size budget is fulfilled by having only 3 DCI payload sizes in a slot for payloads with C-RNTI scrambling (the first four rows of the table with only three sizes A, B and C or A, B and D as sizes C and D occur in different slot sets) and a total of 4 DCI payload sizes (A, B, C and D or A, B, C and an alternative size, depending on the TDM monitoring of the slot set) in a slot. DCI formats 0_0/1_0 with C-RNTI can be also monitored in CSS. Therefore, the base station can transmit UE-specific DL control signaling using fallback DCIs in CSS (in addition to USS) in a TDM manner with USS. A fully configurable size (size E) can be used for DCI formats 2_0/2_1 (in a TDM manner), which gives a better flexibility of DCI signaling.

Figure 8:
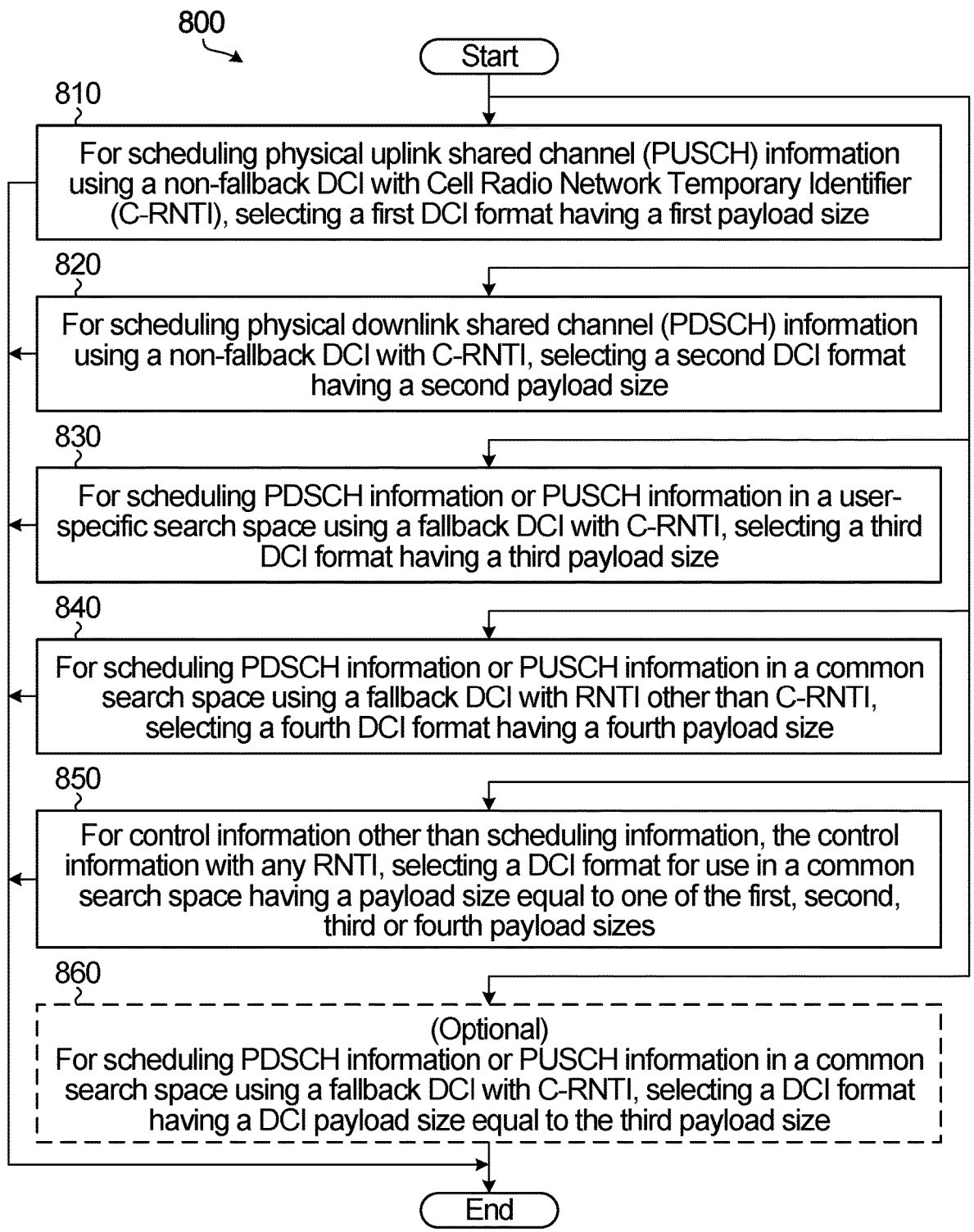
FIG. 8 is a flow chart describing an example method for use by a network-side device in formatting a DCI according to an embodiment of the disclosure.

FIG. 8 illustrates a flow chart describing an example method 800 of selecting downlink control information (DCI) payload sizes. The method involves selecting one of four different DCI payload sizes. For scheduling physical uplink shared channel (PUSCH) information using a non-fallback DCI with Cell Radio Network Temporary Identifier (C-RNTI) scrambling of a CRC in the DCI payload, a first DCI format having a first payload size is selected 810. For scheduling physical downlink shared channel (PDSCH) information using a non-fallback DCI with C-RNTI scrambling, a second DCI format having a second payload size is selected 820. For scheduling PDSCH information or PUSCH information in a user-specific search space using a fallback DCI with C-RNTI scrambling, a third DCI format having a third payload size is selected 830. For scheduling PDSCH information or PUSCH information in a common search space using a fallback DCI with RNTI scrambling other than C-RNTI, a fourth DCI format having a fourth payload size is selected 840. For control information other than scheduling information that is being transmitted with any RNTI type scrambling, a DCI format for use in a common search space having a payload size equal to one of the first, second, third or fourth payload sizes is selected 850. Optionally, for scheduling PDSCH information or PUSCH information in a common search space using a fallback DCI with C-RNTI scrambling, a fifth DCI format having a DCI payload size equal to the third payload size is selected 860.

Figure 9:
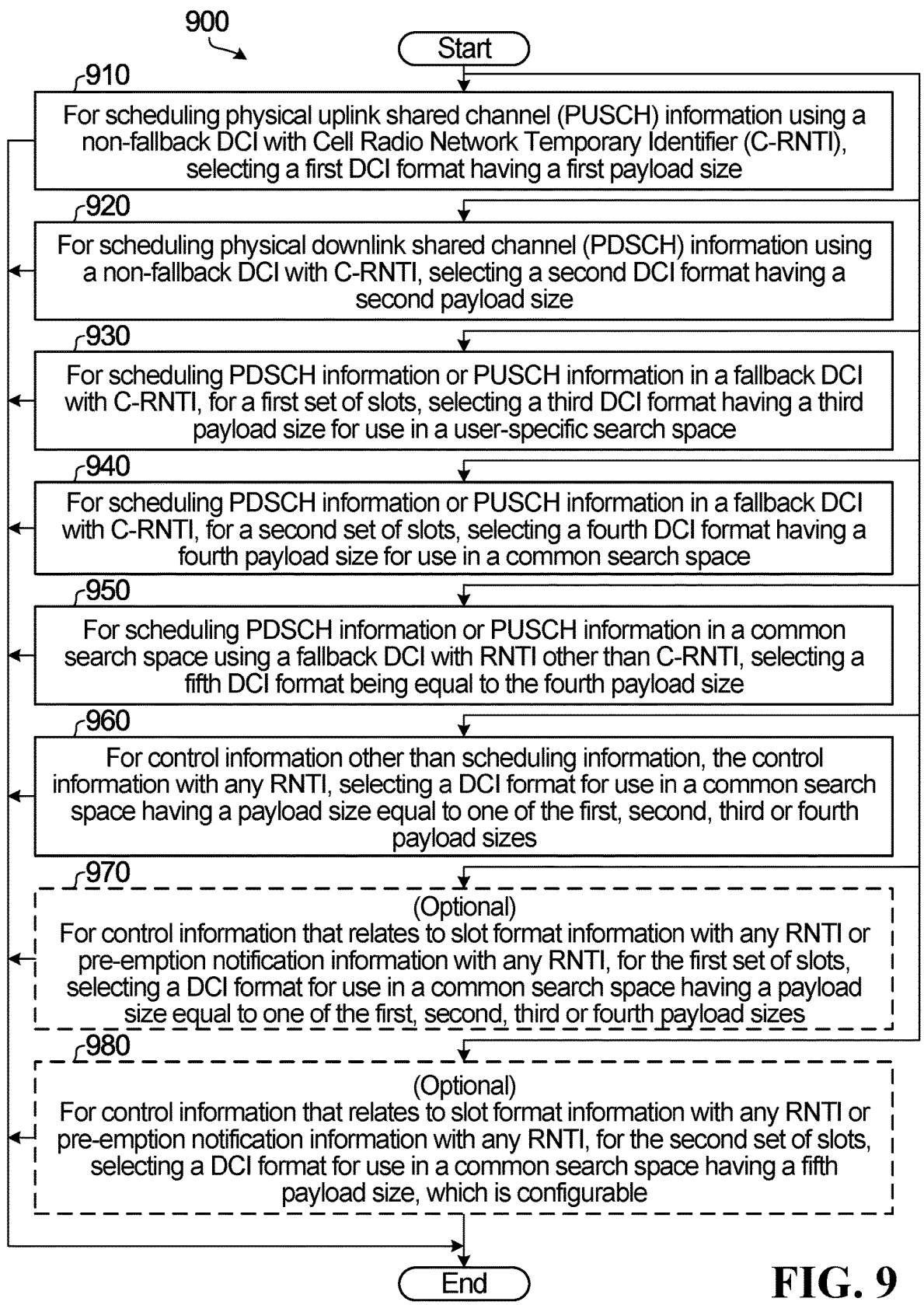
FIG. 9 is a flow chart describing another example method for use by a network-side device in formatting a DCI according to an embodiment of the disclosure.

FIG. 9 illustrates a flow chart describing an example method 900 of selecting DCI payload sizes. The method involves selecting one of four different DCI payload sizes. For scheduling PUSCH information using a non-fallback DCI with C-RNTI scrambling of a CRC in the DCI payload, a first DCI format having a first payload size is selected 910. For scheduling PDSCH information using a non-fallback DCI with C-RNTI scrambling, a second DCI format having a second payload size is selected 920. For scheduling PDSCH information or PUSCH information in a fallback DCI with C-RNTI scrambling, for a first set of slots, a third DCI format having a third payload size for use in a user-specific search space is selected 930. For scheduling PDSCH information or PUSCH information in a fallback DCI with C-RNTI scrambling, for a second set of slots, a fourth DCI format having a fourth payload size for use in a common search space is selected 940. For scheduling PDSCH information or PUSCH information in a common search space using a fallback DCI with RNTI type scrambling other than C-RNTI, a fifth DCI format being equal to the fourth payload size is selected 950. For control information other than scheduling information that is being transmitted with any RNTI type, a DCI format for use in a common search space having a payload size equal to one of the first, second, third or fourth payload sizes is selected 960.

Optionally, when the control information relates to slot format information with any RNTI or pre-emption notification information with any RNTI, for the first set of slots, a DCI format for use in a common search space having a payload size equal to one of the first, second, third or fourth payload sizes is selected 970. Optionally, when the control information relates to slot format information with any RNTI type or pre-emption notification information with any RNTI type, for the second set of slots, a DCI format for use in a common search space having a fifth payload size is selected 980, where the fifth payload size is a configurable size.

Figure 10:
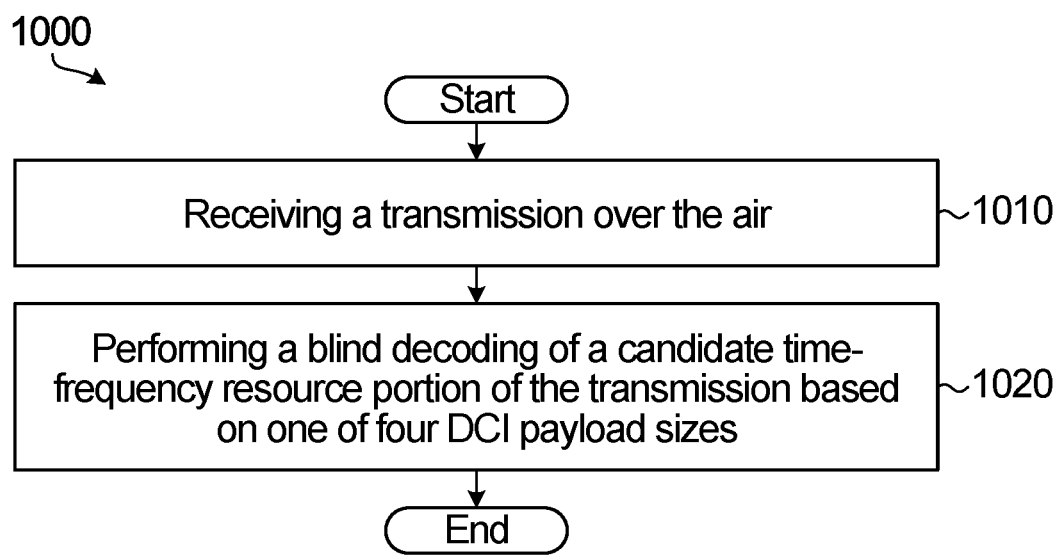
FIG. 10 is a flow chart describing an example method for use by a User Equipment (UE) in decoding a DCI according to an embodiment of the disclosure.

FIG. 10 illustrates a flow chart describing an example method 1000 of decoding DCI based on one of four different DCI payload sizes. The method involves receiving 1010 a transmission over the air. Step 1020 involves performing a blind decoding of a candidate time-frequency resource portion of the transmission. The blind decoding involves selecting one of the four different DCI payload sizes. In a first embodiment, the selecting involves one of a) selecting a first DCI payload size for a first DCI format for PUSCH information in a non-fallback DCI with C-RNTI scrambling of a CRC in the DCI payload, b) selecting a second DCI payload size for a second DCI format for PDSCH information in a non-fallback DCI with C-RNTI scrambling, c) selecting a third DCI payload size for a third DCI format for PDSCH information or PUSCH information in a user-specific search space in a fallback DCI with C-RNTI scrambling, d) selecting a fourth DCI payload size for a fourth DCI format for PDSCH information or PUSCH information in a common search space in a fallback DCI with RNTI other than C-RNTI scrambling, and e) selecting a DCI payload size equal to one of the first, second, third or fourth DCI payload sizes for control information in a common search space other than PUSCH information or PDSCH information, the control information with any RNTI type scrambling. Optionally, selecting the DCI payload size involves selecting a DCI payload size equal to the third DCI payload size for PDSCH information or PUSCH information in a common search space in a fallback DCI with C-RNTI scrambling.

In a second embodiment, the selecting involves one of a) selecting a first DCI payload size for a first DCI format for PUSCH information in a non-fallback DCI with C-RNTI scrambling of a CRC in the DCI payload, b) selecting a second DCI payload size for a second DCI format for PDSCH information in a non-fallback DCI with C-RNTI scrambling. c) for a first set within the slot, selecting a third DCI payload size for a third DCI format for PDSCH information or PUSCH information in a user-specific search space in a fallback DCI with C-RNTI scrambling and for a second set within the slot, selecting a fourth DCI payload size for a fourth DCI format for PDSCH information or PUSCH information in a common search space in a fallback DCI with C-RNTI scrambling, d) selecting a DCI payload size equal to the fourth DCI payload size for PDSCH information or PUSCH information in a common search space in a fallback DCI with RNTI type scrambling other than C-RNTI, and e) selecting a DCI payload size equal to one of the first, second, third or fourth DCI payload sizes for control information in a common search space other than PUSCH information or PDSCH information. Optionally, selecting the DCI payload size involves for the first set within the slots, selecting a DCI payload size equal to one of the first, second, third or fourth DCI payload sizes for control information in a common search space, or in a time-frequency resource size that is not known to a target of the control information and for the second set within the slots, selecting a DCI payload size equal to a fifth payload size for control information in a common search space, where the fifth payload size is a configurable size.

According to a first example of the present disclosure there is provided a method of selecting downlink control information (DCI) payload sizes, the method involving: for scheduling physical uplink shared channel (PUSCH) information using a non-fallback DCI with Cell Radio Network Temporary Identifier (C-RNTI), selecting a first DCI format having a first payload size; for scheduling physical downlink shared channel (PDSCH) information using a non-fallback DCI with C-RNTI, selecting a second DCI format having a second payload size; for scheduling PDSCH information or PUSCH information using a user-specific search space using a fallback DCI with C-RNTI, selecting a third DCI format having a third payload size; for scheduling PDSCH information or PUSCH information using a common search space using a fallback DCI with RNTI other than C-RNTI, selecting a fourth DCI format having a fourth payload size; and for control information other than scheduling information, the control information with any RNTI, selecting a DCI format for use in a common search space having a payload size equal to one of the first, second, third or fourth payload sizes.

In some embodiments, the method further involves, for scheduling PDSCH information or PUSCH information in a common search space using a fallback DCI with C-RNTI, selecting a fifth DCI format, the fifth DCI format having the third payload size.

In some embodiments, when the control information relates to transmission power control (TPC) information with any RNTI, selecting a DCI format for use in a common search space having a payload size equal to the fourth payload size.

In some embodiments, the fourth payload size of the fourth DCI format is based on an initial DL bandwidth part (BWP) for one or more user equipment (UE) the non-fallback DCI or fallback DCI is intended for.

In some embodiments, the first payload size of the first DCI format is based on an active UL bandwidth part (BWP), and the second payload size of the second DCI format and the third payload size of the third DCI format are based on an active DL bandwidth part (BWP) for one or more user equipment (UE) the non-fallback DCI or fallback DCI is intended for.

In some embodiments, the method further involves performing one or more of: appending cyclic redundancy check (CRC) bits to the DCI payload and scrambling the CRC bits with an RNTI; performing forward error correction (FEC) coding on the CRC-appended DCI payload; scrambling the FEC coded DCI payload with a scrambling sequence; modulating the scrambled FEC coded DCI payload to obtain modulated symbols; mapping the modulated symbols to a physical resource prior to transmission; and transmitting the modulated symbols.

In some embodiments, the method further involves padding content intended to fill the DCI payload if the content is smaller than the DCI payload size.

According to a second example of the present disclosure there is provided a method of selecting downlink control information (DCI) payload sizes, the method comprising: for scheduling physical uplink shared channel (PUSCH) information using a non-fallback DCI with Cell Radio Network Temporary Identifier (C-RNTI), selecting a first DCI format having a first payload size; for scheduling physical downlink shared channel (PDSCH) information using a non-fallback DCI with C-RNTI, selecting a second DCI format having a second payload size; for scheduling PDSCH information or PUSCH information in a fallback DCI with C-RNTI: for a first set of slots, selecting a third DCI format for use in a user-specific search space, the third DCI format having a third payload size; for a second set of slots, selecting a fourth DCI format for use in a common search space, the fourth DCI format having a fourth payload size; for scheduling PDSCH information or PUSCH information in a common search space using a fallback DCI with RNTI other than C-RNTI, selecting a fifth DCI format being equal to the fourth payload size; and for control information other than scheduling information, the control information with any RNTI, selecting a DCI format for use in a common search space having a payload size equal to one of the first, second, third or fourth payload sizes.

In some embodiments, the control information relates to slot format information with any RNTI or pre-emption notification information with any RNTI: for the first set of slots, selecting a DCI format for use in a common search space having a payload size equal to one of the first, second, third or fourth payload sizes; and for the second set of slots, selecting a DCI format for use in a common search space having a payload size equal to a fifth payload size, where the fifth payload size is a configurable size.

In some embodiments, when the control information relates to transmission power control (TPC) information with any RNTI, selecting a DCI format for use in a common search space having a payload size equal to the fourth payload size.

In some embodiments, the fourth payload size of the fourth DCI format is based on an initial DL bandwidth part (BWP) for one or more user equipment (UE) the non-fallback DCI or fallback DCI is intended for.

In some embodiments, the first payload size of the first DCI format is based on an active UL bandwidth part (BWP), and the second payload size of the second DCI format and the third payload size of the third DCI format are based on an active DL bandwidth part (BWP) for one or more user equipment (UE) the non-fallback DCI or fallback DCI is intended for.

In some embodiments, the method further involves performing one or more of: appending cyclic redundancy check (CRC) bits to the DCI payload and scrambling the CRC bits with an RNTI; performing forward error correction (FEC) coding on the CRC-appended DCI payload; scrambling the FEC coded DCI payload with a scrambling sequence; modulating the scrambled FEC coded DCI payload to obtain modulated symbols; mapping the modulated symbols to a physical resource prior to transmission; and transmitting the modulated symbols.

In some embodiments, the method further involves padding content intended to fill the DCI payload if the content is smaller than the DCI payload size.

According to a third example of the present disclosure there is provided a method of decoding downlink control information (DCI) based on one of four different DCI payload sizes. The method involves: receiving a transmission over the air and performing a blind decoding of a candidate time-frequency resource portion of the transmission. The blind decoding involves: selecting a first DCI payload size for a first DCI format for physical uplink shared channel (PUSCH) information in a non-fallback DCI with Cell Radio Network Temporary Identifier (C-RNTI); selecting a second DCI payload size for a second DCI format for physical downlink shared channel (PDSCH) information in a non-fallback DCI with C-RNTI; selecting a third DCI payload size for a third DCI format for PDSCH information or PUSCH information in a user-specific search space in a fallback DCI with C-RNTI; selecting a fourth DCI payload size for a fourth DCI format for PDSCH information or PUSCH information in a common search space in a fallback DCI with RNTI other than C-RNTI; and selecting a DCI payload size equal to one of the first, second, third or fourth DCI payload sizes for control information in a common search space other than PUSCH information or PDSCH information, the control information with any RNTI.

In some embodiments, performing the blind decoding of the candidate time-frequency resource portion of the transmission further comprises selecting a DCI payload size equal to the third DCI payload size for PDSCH information or PUSCH information in a common search space in a fallback DCI with C-RNTI.

According to a fourth example of the present disclosure there is provided a method of decoding downlink control information (DCI) based on one of four different DCI payload sizes. The method involves receiving a transmission over the air and performing a blind decoding of a candidate time-frequency resource portion of the transmission. The blind decoding involves: selecting a first DCI payload size for a first DCI format for physical uplink shared channel (PUSCH) information in a non-fallback DCI with Cell Radio Network Temporary Identifier (C-RNTI); selecting a second DCI payload size for a second DCI format for physical downlink shared channel (PDSCH) information in a non-fallback DCI with C-RNTI; for a first set within the slot, selecting a third DCI payload size for a third DCI format for PDSCH information or PUSCH information in a user-specific search space in a fallback DCI with C-RNTI; for a second set within the slot, selecting a fourth DCI payload size for a fourth DCI format for PDSCH information or PUSCH information in a common search space in a fallback DCI with C-RNTI; selecting a DCI payload size equal to the fourth DCI payload size for PDSCH information or PUSCH information in a common search space in a fallback DCI with RNTI other than C-RNTI; and selecting a DCI payload size equal to one of the first, second, third or fourth DCI payload sizes for control information in a common search space other than PUSCH information or PDSCH information.

In some embodiments, performing the blind decoding of the candidate time-frequency resource portion of the transmission further involves: for the first set within the slots, selecting a DCI payload size equal to one of the first, second, third or fourth DCI payload sizes for control information in a common search space, or in a time-frequency resource size that is not known to a target of the control information; and for the second set within the slots, selecting a DCI payload size equal a fifth DCI payload size for control information in a common search space.

According to a fifth example of the present disclosure there is provided a device includes a processor and a computer-readable medium having stored thereon computer-executable instructions. When executed by the processor, the computer-executable instructions cause the device to: for scheduling physical uplink shared channel (PUSCH) information using a non-fallback DCI with Cell Radio Network Temporary Identifier (C-RNTI), select a first DCI format having a first payload size; for scheduling physical downlink shared channel (PDSCH) information using a non-fallback DCI with C-RNTI, select a second DCI format having a second payload size; for scheduling PDSCH information or PUSCH information in a user-specific search space using a fallback DCI with C-RNTI, select a third DCI format having a third payload size; for scheduling PDSCH information or PUSCH information in a common search space using a fallback DCI with RNTI other than C-RNTI, select a fourth DCI format having a fourth time-frequency resource size; and for control information other than scheduling information, the control information with any RNTI, select a DCI format for use in a common search space having a payload size equal to one of the first, second, third or fourth payload sizes.

In some embodiments, the computer-executable instructions when executed by the processor, further cause the device to: for scheduling PDSCH information or PUSCH information in a common search space using a fallback DCI with C-RNTI, select a fifth DCI format, the fifth DCI format having the third payload size.

In some embodiments, when the control information relates to transmission power control (TPC) information with any RNTI, selecting a DCI format for use in a common search space having a payload size equal to the fourth payload size.

In some embodiments, the fourth payload size of the fourth DCI format is based on an initial DL bandwidth part (BWP) for one or more user equipment (UE) the non-fallback DCI or fallback DCI is intended for.

In some embodiments, the first payload size of the first DCI format is based on an active UL bandwidth part (BWP), and the second payload size of the second DCI format and the third payload size of the third DCI format are based on an active DL bandwidth part (BWP) for one or more user equipment (UE) the non-fallback DCI or fallback DCI is intended for.

In some embodiments, the computer-executable instructions when executed by the processor, further cause the device to: append cyclic redundancy check (CRC) bits to the DCI payload and scrambling the CRC bits with an RNTI; perform forward error correction (FEC) coding on the CRC-appended DCI payload; scramble the FEC coded DCI payload with a scrambling sequence; modulate the scrambled FEC coded DCI payload to obtain modulated symbols; map the modulated symbols to a physical resource prior to transmission; and transmit the modulated symbols.

According to a sixth example of the present disclosure there is provided a device including a processor and a computer-readable medium having stored thereon computer-executable instructions. When executed by the processor, the computer-executable instructions cause the device to: for scheduling physical uplink shared channel (PUSCH) information using a non-fallback DCI with Cell Radio Network Temporary Identifier (C-RNTI), select a first DCI format having a first payload size; for scheduling physical downlink shared channel (PDSCH) information using a non-fallback DCI with C-RNTI, select a second DCI format having a second payload size; for scheduling PDSCH information or PUSCH information in a fallback DCI with C-RNTI: for a first set of slots, select a third DCI format for use in a user-specific search space, the third DCI format having a third payload size; for a second set of slots, select a fourth DCI format for use in a common search space, the fourth DCI format having a fourth payload size; for scheduling PDSCH information or PUSCH information in a common search space using a fallback DCI with RNTI other than C-RNTI, select a fifth DCI format being equal to the fourth payload size; and for control information other than scheduling information, the control information with any RNTI, select a DCI format for use in a common search space having a payload size equal to one of the first, second, third or fourth payload sizes.

In some embodiments, when the control information relates to slot format information with any RNTI or pre-emption notification information with any RNTI: for the first set of slots, select a DCI format for use in a common search space having a payload size equal to one of the first, second, third or fourth payload sizes; and for the second set of slots, select a DCI format for use in a common search space having a payload size equal to a fifth payload size, where the fifth payload size is a configurable size.

In some embodiments, when the control information relates to transmission power control (TPC) information with any RNTI, select a DCI format for use in a common search space having a payload size equal to the fourth payload size.

In some embodiments, the fourth payload size of the fourth DCI format is based on an initial DL bandwidth part (BWP) for one or more user equipment (UE) the non-fallback DCI or fallback DCI is intended for.

In some embodiments, the first payload size of the first DCI format is based on an active UL bandwidth part (BWP), and the second payload size of the second DCI format and the third payload size of the third DCI format are based on an active DL bandwidth part (BWP) for one or more user equipment (UE) the non-fallback DCI or fallback DCI is intended for.

In some embodiments, the computer-executable instructions when executed by the processor, further cause the device to: append cyclic redundancy check (CRC) bits to the DCI payload and scrambling the CRC bits with an RNTI; perform forward error correction (FEC) coding on the CRC-appended DCI payload; scramble the FEC coded DCI payload with a scrambling sequence; modulate the scrambled FEC coded DCI payload to obtain modulated symbols; map the modulated symbols to a physical resource prior to transmission; and transmit the modulated symbols.

In some embodiments, the computer-executable instructions when executed by the processor, further cause the device to pad content intended to fill the DCI payload if the content is smaller than the DCI payload size.

According to a seventh example of the present disclosure there is provided a user equipment (UE) including a processor and a computer-readable medium having stored thereon computer-executable instructions. When executed by the processor, the computer-executable instructions cause the UE to: receive a transmission over the air and perform a blind decoding of a candidate time-frequency resource portion of the transmission. The blind decoding is performed by: selecting a first DCI payload size for a first DCI format for physical uplink shared channel (PUSCH) information in a non-fallback DCI with Cell Radio Network Temporary Identifier (C-RNTI); selecting a second DCI payload size for a second DCI format for physical downlink shared channel (PDSCH) information in a non-fallback DCI with C-RNTI; selecting a third DCI payload size for a third DCI format for PDSCH information or PUSCH information in a user-specific search space in a fallback DCI with C-RNTI; selecting a fourth DCI payload size for a fourth DCI format for PDSCH information or PUSCH information in a common search space in a fallback DCI with RNTI other than C-RNTI; and selecting a DCI payload size equal to one of the first, second, third or fourth DCI payload sizes for control information in a common search space other than PUSCH information or PDSCH information, the control information with any RNTI.

In some embodiments, performing the blind decoding of the candidate time-frequency resource portion of the transmission further involves selecting a DCI payload size equal to the third DCI payload size for PDSCH information or PUSCH information in a common search space in a fallback DCI with C-RNTI.

According to an eighth example of the present disclosure there is provided a user equipment (UE) including a processor and a computer-readable medium having stored thereon computer-executable instructions. When executed by the processor, the computer-executable instructions cause the UE to: receive a transmission over the air and perform a blind decoding of a candidate time-frequency resource portion of the transmission. The blind decoding is performed by selecting a first DCI payload size for a first DCI format for physical uplink shared channel (PUSCH) information in a non-fallback DCI with Cell Radio Network Temporary Identifier (C-RNTI); selecting a second DCI payload size for a second DCI format for physical downlink shared channel (PDSCH) information in a non-fallback DCI with C-RNTI; for a first set within the slot, selecting a third DCI payload size for a third DCI format for PDSCH information or PUSCH information in a user-specific search space in a fallback DCI with C-RNTI; for a second set within the slot, selecting a fourth DCI payload size for a fourth DCI format for PDSCH information or PUSCH information in a common search space in a fallback DCI with C-RNTI; selecting a DCI payload size equal to the fourth DCI payload size for PDSCH information or PUSCH information in a common search space in a fallback DCI with RNTI other than C-RNTI; and selecting a DCI payload size equal to one of the first, second, third or fourth DCI payload sizes for control information in a common search space other than PUSCH information or PDSCH information.

In some embodiments, performing the blind decoding of the candidate time-frequency resource portion of the transmission further involves for the first set within the slots, selecting a DCI payload size equal to one of the first, second, third or fourth DCI payload sizes for control information in a common search space, or in a time-frequency resource size that is not known to a target of the control information; and for the second set within the slots, selecting a DCI payload size equal a fifth DCI payload size for control information in a common search space.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of transmitting comprising:
transmitting:
control information for scheduling a physical uplink shared channel (PUSCH) using a non-fallback DCI in a first DCI format having a first payload size based on an active uplink (UL) bandwidth part (BWP); and
control information for scheduling a physical downlink shared channel (PDSCH) using a non-fallback DCI in a second DCI format having a second payload size based on an active downlink (DL) bandwidth part (BWP); and
control information for scheduling a PDSCH or a PUSCH using a user-specific search space using a fallback DCI in a third DCI format having a third payload size based on the active DL BWP; and
control information for scheduling a PDSCH or a PUSCH using a common search space using a fallback DCI in a fourth DCI format having a fourth payload size based on an initial downlink (DL) bandwidth part (BWP); and
control information related to at least one of: identifying a slot format or pre-emption notification information, in a DCI format for use in a common search space having a payload size equal to one of a first, second, third or fourth payload sizes, wherein at most four different DCI payload sizes are used during a slot, the four different DCI payload sizes including the first payload size, the second payload size, the third payload size, and the fourth payload size.

2. The method of claim 1, further comprising transmitting control information related to transmission power control (TPC) information in a DCI format for use in a common search space having a payload size equal to the fourth payload size.

3. The method of claim 1 further comprising performing one or more of:
appending cyclic redundancy check (CRC) bits to the DCI payload and scrambling the CRC bits with an RNTI;
performing forward error correction (FEC) coding on the CRC-appended DCI payload;
scrambling the FEC coded DCI payload with a scrambling sequence;
modulating the scrambled FEC coded DCI payload to obtain modulated symbols;
mapping the modulated symbols to a physical resource prior to transmission; and
transmitting the modulated symbols.

4. The method of claim 1 further comprising padding content intended to fill the DCI payload when the content is smaller than the DCI payload size.

5. A method of decoding downlink control information (DCI), the method comprising:
receiving a transmission;
performing a blind decoding of a candidate time-frequency resource portion of the transmission by:
selecting a first DCI payload size for a first DCI format for physical uplink shared channel (PUSCH) information in a non-fallback DCI, the first payload size for the first DCI format based on an active uplink (UL) bandwidth part (BWP);
selecting a second DCI payload size for a second DCI format for physical downlink shared channel (PDSCH) information in a non-fallback DCI, the second payload size for the second DCI format based on an active downlink (DL) BWP;
selecting a third DCI payload size for a third DCI format for PDSCH information or PUSCH information in a user-specific search space in a fallback DCI, the third payload size for the third DCI format based on the active DL BWP;
selecting a fourth DCI payload size for a fourth DCI format for PDSCH information or PUSCH information in a common search space in a fallback DCI, the fourth payload size for the fourth DCI format based on an initial downlink (DL) bandwidth part (BWP); and selecting a DCI payload size equal to one of the first, second, third or fourth DCI payload sizes for control information that relates to slot format information or pre-emption notification information in a common search space, wherein at most four different DCI payload sizes are used during a slot, the four different DCI payload sizes including the first DCI payload size, the second DCI payload size, the third DCI payload size, and the fourth DCI payload size.

6. The method of claim 5, wherein performing the blind decoding of the candidate time-frequency resource portion of the transmission further comprises selecting a DCI payload size equal to the third DCI payload size for PDSCH information or PUSCH information in a common search space in a fallback DCI.

7. A device comprising:
a processor;
a computer-readable medium having stored thereon computer-executable instructions, that when executed by the processor, cause the device to transmit:
control information for scheduling a physical uplink shared channel (PUSCH) using a non-fallback DCI in a first DCI format having a first payload size based on an active uplink (UL) bandwidth part (BWP); and
control information for scheduling a physical downlink shared channel (PDSCH) using a non-fallback DCI in a second DCI format having a second payload size based on an active downlink (DL) bandwidth part (BWP); and
control information for scheduling a PDSCH or a PUSCH in a user-specific search space using a fallback DCI in a third DCI format having a third payload size based on the active DL BWP; and
control information for scheduling a PDSCH or a PUSCH in a common search space using a fallback DCI in a fourth DCI format having a fourth payload size based on an initial downlink (DL) bandwidth part (BWP); and
control information related to at least one of: identifying a slot format or pre-emption notification information, in a DCI format for use in a common search space having a payload size equal to one of the first, second, third or fourth payload sizes, wherein at most four different DCI payload sizes are used during a slot, the four different DCI payload sizes including the first payload size, the second payload size, the third payload size, and the fourth payload size.

8. The device of claim 7, further comprising computer-executable instructions, that when executed by the processor, cause the device to transmit control information related to transmission power control (TPC) information in a DCI format for use in a common search space having a payload size equal to the fourth payload size.

9. The device of claim 7, wherein the fourth payload size of the fourth DCI format is based on an initial downlink (DL) bandwidth part (BWP).

10. The device of claim 7, wherein the first payload size of the first DCI format is based on an active uplink (UL) bandwidth part (BWP), and the second payload size of the second DCI format and the third payload size of the third DCI format are based on an active downlink (DL) bandwidth part (BWP) for one or more user equipment (UE) the non-fallback DCI or fallback DCI is intended for.

11. The device of claim 7, wherein the computer-executable instructions when executed by the processor, further cause the device to:
append cyclic redundancy check (CRC) bits to the DCI payload and scrambling the CRC bits with an RNTI;
perform forward error correction (FEC) coding on the CRC-appended DCI payload;
scramble the FEC coded DCI payload with a scrambling sequence;
modulate the scrambled FEC coded DCI payload to obtain modulated symbols;
map the modulated symbols to a physical resource prior to transmission; and
transmit the modulated symbols.

12. The device of claim 7, wherein the computer-executable instructions when executed by the processor, further cause the device to: pad content intended to fill the DCI payload when the content is smaller than the DCI payload size.

13. A user equipment (UE) comprising:
a processor;
a computer-readable medium having stored thereon computer-executable instructions, that when executed by the processor, cause the UE to:
receive a transmission; and
perform a blind decoding of a candidate time-frequency resource portion of the transmission by:
selecting a first DCI payload size for a first DCI format for physical uplink shared channel (PUSCH) information in a non-fallback DCI, the first payload size for the first DCI format based on an active uplink (UL) bandwidth part (BWP);
selecting a second DCI payload size for a second DCI format for physical downlink shared channel (PDSCH) information in a non-fallback DCI, the second payload size for the second DCI format based on an active downlink (DL) BWP;
selecting a third DCI payload size for a third DCI format for PDSCH information or PUSCH information in a user-specific search space in a fallback DCI, the third payload size for the third DCI format based on the active DL BWP;
selecting a fourth DCI payload size for a fourth DCI format for PDSCH information or PUSCH information in a common search space in a fallback DCI, the fourth payload size for the fourth DCI format based on an initial downlink (DL) bandwidth part (BWP); and
selecting a DCI payload size equal to one of the first, second, third or fourth DCI payload sizes for slot format information or pre-emption information in a common search space, wherein at most four different DCI payload sizes are used during a slot, the four different DCI payload sizes including the first DCI payload size, the second DCI payload size, the third DCI payload size, and the fourth DCI payload size.

14. The UE of claim 13, wherein performing the blind decoding of the candidate time-frequency resource portion of the transmission further comprises selecting a DCI payload size equal to the third DCI payload size for PDSCH information or PUSCH information in a common search space in a fallback DCI.

* * * * *